United States Patent
Hatch

(10) Patent No.: US 12,204,618 B1
(45) Date of Patent: *Jan. 21, 2025

(54) AUTHENTICATION USING THIRD-PARTY DATA

(71) Applicant: Wells Fargo Bank, N.A., San Francisco, CA (US)

(72) Inventor: David Hatch, Daly City, CA (US)

(73) Assignee: Wells Fargo Bank, N.A., San Francisco, CA (US)

( * ) Notice: Subject to any disclaimer, the term of this patent is extended or adjusted under 35 U.S.C. 154(b) by 806 days.

This patent is subject to a terminal disclaimer.

(21) Appl. No.: 17/379,720

(22) Filed: Jul. 19, 2021

Related U.S. Application Data

(63) Continuation of application No. 16/707,806, filed on Dec. 9, 2019, now Pat. No. 11,068,570, which is a continuation of application No. 16/005,438, filed on Jun. 11, 2018, now Pat. No. 10,521,573, which is a continuation of application No. 14/881,123, filed on Oct. 12, 2015, now Pat. No. 10,025,914.

(51) Int. Cl.
| | |
|---|---|
| *G06F 21/31* | (2013.01) |
| *G06F 21/36* | (2013.01) |
| *H04L 9/40* | (2022.01) |

(52) U.S. Cl.
CPC ............ *G06F 21/316* (2013.01); *G06F 21/36* (2013.01); *H04L 63/0428* (2013.01); *H04L 63/0884* (2013.01); *H04L 63/105* (2013.01)

(58) Field of Classification Search
CPC ... G06F 21/316; G06F 21/36; H04L 63/0428; H04L 63/0884; H04L 63/105
USPC .............................................................. 726/7
See application file for complete search history.

(56) References Cited

U.S. PATENT DOCUMENTS

| | | | |
|---|---|---|---|
| 7,231,657 | B2 | 6/2007 | Honarvar et al. |
| 7,496,637 | B2 | 2/2009 | Han et al. |
| (Continued) | | | |

FOREIGN PATENT DOCUMENTS

| | | |
|---|---|---|
| WO | 2014182957 A1 | 11/2014 |

OTHER PUBLICATIONS

Hanumanthappa et al., 2012 IEEE International Conference on Innovations in Information Technology (IIT), "Privacy Preserving and Ownership Authentication in Ubiquitous Computing Devices using Secure Three Way Authentication", pp. 107-112 (Year: 2012).*

(Continued)

*Primary Examiner* — Khalil Naghdali
(74) *Attorney, Agent, or Firm* — Shumaker & Sieffert, P.A.

(57) ABSTRACT

In an example, techniques of this disclosure include establishing, by a computing device, authentication data for authenticating a user of a service provided by a service provider, where the authentication data comprises one or more first data entries and one or more second data entries that correspond to the one or more first data entries. The techniques also include retrieving, from at least one third-party service provider, one or more second data entries maintained by the at least one third-party service provider that correspond to the one or more first data entries, and authenticating the user based on the authentication data, where authenticating the user comprises comparing the one or more first data entries to the one or more second data entries retrieved from the at least one third-party service provider.

20 Claims, 4 Drawing Sheets

(56) References Cited

U.S. PATENT DOCUMENTS

| | | | |
|---|---|---|---|
| 8,391,825 | B2 | 3/2013 | Arseneau et al. |
| 8,667,279 | B2 | 3/2014 | Rao |
| 8,838,748 | B2 | 9/2014 | Nair et al. |
| 9,674,205 | B2 | 6/2017 | Kirkham et al. |
| 10,025,914 | B1 | 7/2018 | Hatch |
| 10,509,900 | B1* | 12/2019 | Shahbazi ............ G06F 21/45 |
| 10,521,573 | B1 | 12/2019 | Hatch |
| 11,068,570 | B1 | 7/2021 | Hatch |
| 2002/0048369 | A1 | 4/2002 | Ginter et al. |
| 2003/0149781 | A1 | 8/2003 | Yared et al. |
| 2006/0282660 | A1 | 12/2006 | Varghese et al. |
| 2007/0018952 | A1 | 1/2007 | Arseneau et al. |
| 2007/0174709 | A1 | 7/2007 | Sluiman et al. |
| 2007/0201502 | A1 | 8/2007 | Abramson |
| 2008/0189420 | A1 | 8/2008 | Herrod et al. |
| 2009/0138951 | A1 | 5/2009 | Birk et al. |
| 2009/0282460 | A1 | 11/2009 | Brooks |
| 2010/0125504 | A1 | 5/2010 | Agha |
| 2011/0265165 | A1 | 10/2011 | Lam |
| 2012/0066752 | A1 | 3/2012 | Vysogorets et al. |
| 2013/0145148 | A1 | 6/2013 | Shablygin et al. |
| 2013/0278631 | A1 | 10/2013 | Border et al. |
| 2015/0161366 | A1 | 6/2015 | Ghosh et al. |
| 2015/0310188 | A1 | 10/2015 | Ford et al. |
| 2016/0212116 | A1 | 7/2016 | Becker et al. |
| 2016/0358178 | A1 | 12/2016 | Ghosh et al. |
| 2017/0372316 | A1 | 12/2017 | Ghosh et al. |

OTHER PUBLICATIONS

Alotaibi et al., 2015 IEEE Conferences, "Enhancing OAuth Services Security by an Authentication Service with Face Recognition", pp. 1-6 (Year: 2015).*

Prosecution History from U.S. Appl. No. 14/881,123, dated Jul. 3, 2017 through Jun. 22, 2018, 96 pp.

Paul et al., "5G-Enabled Decentralised Services", 2015 IEEE, Date of Conference: May 11-14, 2015, 5 pages.

Prosecution History from U.S. Appl. No. 16/005,438, dated Dec. 26, 2018 through Nov. 25, 2019, 72 pp.

Rodriguez et al., "Extending e-business to pervasive computing devices", IBM.com/redbooks, Apr. 2001, pp. 1-277.

Sundareswaran et al., "Ensuring Distributed Accountability for Data Sharing in the Cloud", IEEE Transactions on Dependable and Secure Computing, vol. 9, No. 4, Jul./Aug. 2012, pp. 556-568.

Zhang et al., "NDCMC: A Hybrid Data Collection Approach for Large-Scale WSNs Using Mobile Element and Hierarchical Clustering", IEEE Internet of Things Journal, vol. 3, No. 4, Aug. 2016, pp. 533-543.

Prosecution History from U.S. Appl. No. 16/707,806, dated Oct. 30, 2019, through Mar. 25, 2021, 25 pp.

* cited by examiner

AUTHENTICATION USING THIRD-PARTY DATA

This application is a continuation of U.S. application Ser. No. 16/707,806, filed Dec. 9, 2019, which is a continuation of U.S. application Ser. No. 16/005,438, filed Jun. 11, 2018 (now U.S. Pat. No. 10,521,573), which is a continuation of U.S. application Ser. No. 14/881,123, filed Oct. 12, 2015 (now U.S. Pat. No. 10,025,914), the entire contents of each of which is incorporated herein by reference.

TECHNICAL FIELD

The disclosure relates to security and authentication techniques.

BACKGROUND

Service providers may use a variety of user authentication tools to verify an identity of a user. For example, a service provider may use the authentication tools to verify the identity of the user prior to providing information or services access to the user. The user authentication tools may be based on data that uniquely identifies the user. Example authentication tools include a password, a personal identification number, personal information about the user, or the like. In an example, a banking service may prompt a user to provide password and/or a personal identification number prior to providing account information to the user.

In some instances, a service provider may use a multi-factor authentication technique to verify an identity of a user when sharing private data with the user. In an example, a user may wish to recover or reset a password that was previously established with a service provider. In this example, the service provider may initially prompt a user to provide pre-established personal information (e.g., the user's city of birth, maiden name, or the like). Upon verifying the personal information, the service provider may issue a phone call, an email or a text message that contains the password or instructions for resetting the password.

SUMMARY

In general, this disclosure includes techniques for retrieving data from one or more third-party service providers to authenticate a user of a separate service provider and/or share information with the user of the separate service provider. For example, a service provider may establish, with a user of the service provider, data entries that are retained by the service provider and that are shared with one or more third-party service providers. In one example, the service provider may be a banking service provider or other financial service provider, and the data entries may include text, pictures, video, or other data that is relevant and potentially unique to the user and may be shared with one or more user accounts established at one or more third-party social media service providers.

By establishing the data entries at the third party service providers, a private key is formed between the service provider and the user that may be used to authenticate the user in subsequent interactions between the service provider and the user. For example, to authenticate the user, the service provider may present a number of data entries to the user for selection, where the presented data entries include the established data entries as well as one or more other data entries. Upon selection of the established data entries at the service provider, the service provider may retrieve the established data entries that were previously shared with the appropriate one or more third-party service providers. The service provider may verify that the selected data entries correspond to the data entries retrieved from the one or more third-party service providers, thereby authenticating the user. In some examples, the data entries shared with the one or more third party service providers may be modified, such that the service provider retrieves modified versions of the data entries and verifies the modifications to authenticate the user.

In an example, a method includes establishing, by a computing device, authentication data for authenticating a user of a service provided by a service provider, wherein the authentication data comprises one or more first data entries and one or more second data entries that correspond to the one or more first data entries. The method also includes retrieving, from at least one third-party service provider, the one or more second data entries maintained by the at least one third-party service provider that correspond to the one or more first data entries, and authenticating the user based on the authentication data, wherein authenticating the user comprises comparing the one or more first data entries to the one or more second data entries retrieved from the at least one third-party service provider.

In another example, a computing device includes one or more storage units configured to store one or more first data entries and one or more second data entries that correspond to the one or more first data entries and one or more processors. The one or more processors are configured to establish authentication data for authenticating a user of a service provided by a service provider, wherein the authentication data comprises the one or more first data entries and the one or more second data entries, retrieve, from at least one third-party service provider, the one or more second data entries maintained by the at least one third-party service provider that correspond to the one or more first data entries, and authenticate the user based on the authentication data, wherein the one or more processors are further configured to compare the one or more first data entries to the one or more second data entries retrieved from the at least one third-party service provider.

In another example, a non-transitory computer readable medium has instructions stored thereon that, when executed, cause one or more processors to establish authentication data for authenticating a user of a service provided by a service provider, wherein the authentication data comprises one or more first data entries and one or more second data entries that correspond to the one or more first data entries, retrieve, from at least one third-party service provider, the one or more second data entries maintained by the at least one third-party service provider that correspond to the one or more first data entries, and authenticate the user based on the authentication data, wherein authenticating the user comprises comparing the one or more first data entries to the one or more second data entries retrieved from the at least one third-party service provider.

The details of one or more examples of the disclosure are set forth in the accompanying drawings and the description below. Other features, objects, and advantages of the disclosure will be apparent from the description and drawings, and from the claims.

DETAILED DESCRIPTION

Figure 1:
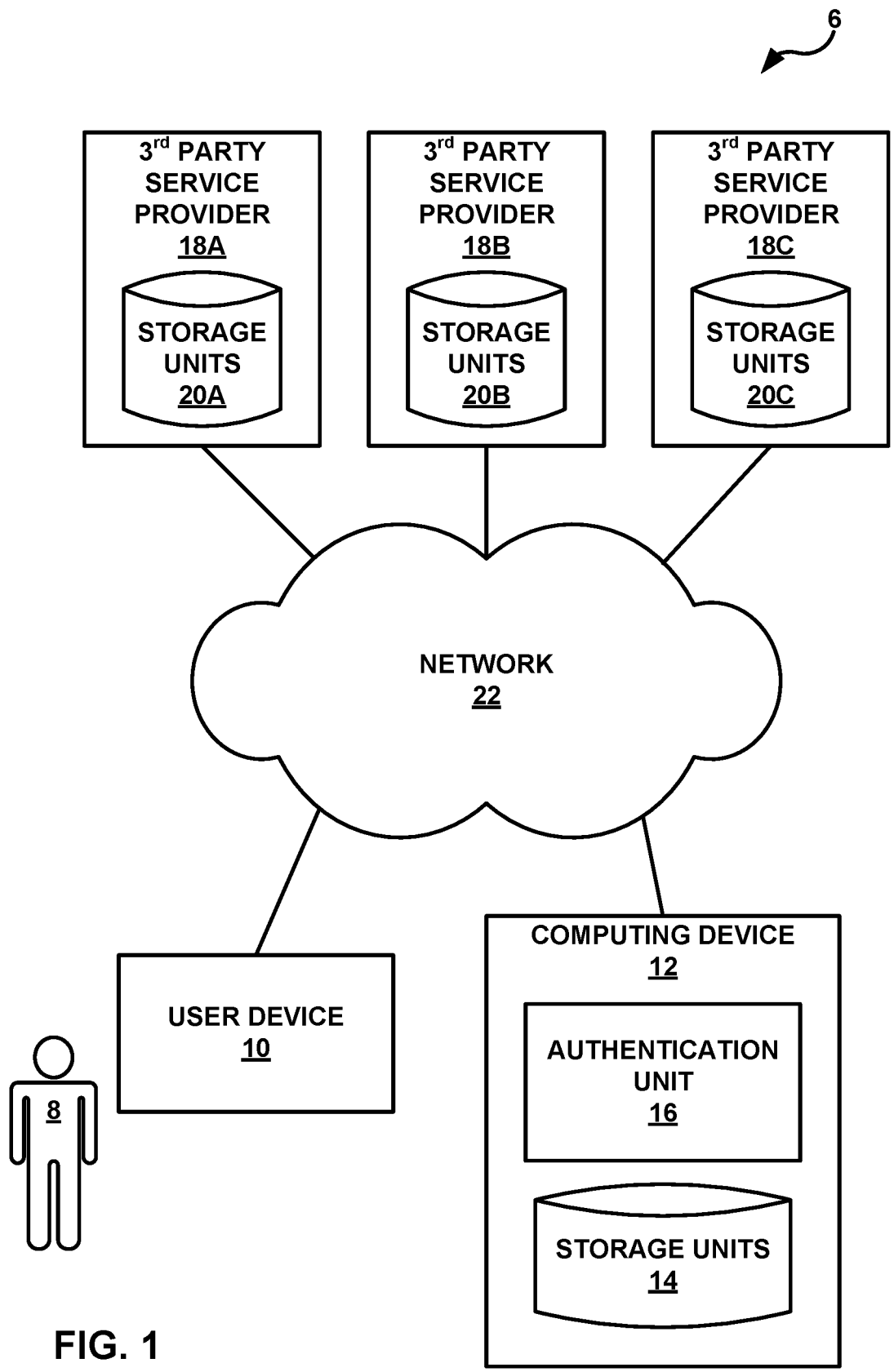
FIG. 1 is a block diagram illustrating an example computing system with an authentication unit configured to authenticate a user of a service provider in accordance with the techniques of this disclosure.

FIG. 1 is a block diagram illustrating an example networked environment 6 that includes a user 8 having a user device 10 and a computing device 12 having storage units 14 and an authentication unit 16. Networked environment 6 also includes a plurality of third-party service providers 18A, 18B, and 18C (collectively, third-party service providers 18) each having respective storage units 20A, 20B, and 20C. In the example of FIG. 1, user device 10, computing device 12, and third-party service providers 18 communicate via network 22.

User device 10 may be a variety of electronic devices that allow a user to communicate with computing device 12 and third-party service providers 18 via network 22. For example, user device 10 may be a portable or mobile device such as a cellular phone or another wireless communication device, laptop computer, tablet, portable gaming device, portable media player, e-book reader, watch, as well as a non-portable device such as a desktop computer. In some examples, user device 10 may execute a variety of applications that are associated with a service provided by computing device 12 and services provided by third-party service providers 18. In a particular example for purposes of illustration, user device 10 may execute a financial services application associated with computing device 12 and one or more social networking applications associated with third-party service providers 18.

Computing device 12 may include a variety of devices for processing and/or manipulating data. For example, in general, the functionality of computing device 12 may be implemented in a device that includes one or more processing units, such as one or more microprocessors. The functionality of computing device 12 may be implemented in hardware or in a combination of software and hardware, where requisite hardware may be provided to store and execute software instructions. Such hardware may include, for example, a processing unit and a computer-readable storage medium. Other hardware may include digital signal processors (DSPs), application specific integrated circuits (ASICs), field programmable gate arrays (FPGAs), or any other equivalent integrated or discrete logic circuitry, as well as any combinations of such components. While shown as a single computing device in the example of FIG. 1 for purposes of illustration, in some examples, computing device 12 may include or participate in a distributed network of computing devices including one or more databases, file servers, and/or other computing devices.

Computing device 12 may host one or more services for access by user 8. In an example for purposes of illustration, computing device 12 may host services associated with a financial institution that offers different banking products, such as checking accounts, savings accounts, and credit accounts; and different lending products, such as home loans, car loans, business loans, student loans, and the like. In this example, user 8 may access, via user device 10, one or more financial accounts maintained by computing device 12. Hence, computing device 12 may communicate with one or more applications executed at user device 10, such as personal and/or institutional banking applications. As described in greater detail below, computing device 12 may also be configured to communicate with third-party service providers 18.

Storage units 14 within computing device 12 may store an operating system (not shown) that controls the operation of components of computing device 12. Storage units 14 may also be used by software or applications executed by computing device 12 to store information during program execution. Storage units 14 may include a computer-readable storage medium or computer-readable storage device. In some examples, storage units 14 include one or more of a short-term memory or a long-term memory. Storage units 14 may include, for example, random access memories (RAM), dynamic random access memories (DRAM), static random access memories (SRAM), magnetic hard discs, optical discs, flash memories, or forms of electrically programmable memories (EPROM) or electrically erasable and programmable memories (EEPROM).

Authentication unit 16 of computing device 12 may be responsible for authenticating user 8 and/or user device 10 when accessing a service provided by computing device 12. For example, authentication unit 16 may authenticate an identity of user 8 based on data that uniquely identifies user 8. Accordingly, authentication unit 16 may be responsible for providing or denying access to user 8 for services provided by computing device 12 and/or information stored by storage units 14.

Third-party service providers 18 may provide respective services for access by user 8 via user device 10. In an example for purposes of illustration, third-party service providers 18 may comprise a variety of social media service providers that allow user 8 to post and share data (e.g., text, images, videos, and the like) with other users of the service. In this example, third-party service providers 18 may store data generated by user 8 to storage units 20. For example, user 8 may generate text, images, video, or other data using user device 10 and transmit the data to third-party service providers 18 for storage at storage units 20. Other users of the third-party service providers 18 may then access the user generated data.

User device 10, computing device 12, and third-party service providers 18 may be connected to network 22 via wired and/or wireless links. The links may form part of a packet-based network, such as a local area network, a wide-area network, or a global network such as the Internet. The links may include routers, switches, base stations, or any other equipment that may be useful to facilitate communication between user device 10, computing device 12, and third-party service providers 18 via network 22.

As noted above, computing device 12 and third-party service providers 18 may authenticate user 8 before providing access or services to user 8. Conventional techniques for authenticating user 8 may include passwords, personal identification numbers, personal information about user 8, or the like. However, such information may be stolen, derived, or otherwise determined by a party other than user 8 based on common authentication inputs (e.g., commonly used passwords) and/or discoverable information about user 8, which may reduce the effectiveness of the authentication techniques.

This disclosure includes techniques that enable computing device 12 to authenticate user 8 by retrieving data from user accounts at one or more of third-party service providers 18. In some examples, this disclosure provides a technical solution to the above described issue of authentication using a networked, multi-party system to verify information about user 8 from more than one computerized source. As described in greater detail below, in some instances, the techniques may provide enhanced security and may allow user 8 to control the data being used to authenticate the identity of user 8.

In an example, according to aspects of this disclosure, authentication unit 16 of computing device 12 may establish authentication data for authenticating user 8. The authentication data may include one or more first data entries, such as any combination of text, images, video, or other data, and one or more second data entries that correspond to the one or more first data entries. To authenticate user 8, authentication unit 16 may retrieve, from at least one of third-party service provider 18, the one or more second data entries maintained by third-party service providers 18 that correspond to the one or more first data entries established at computing device 12. Authentication unit 16 may authenticate user 8 based on a comparison of the first data entries (e.g., the established authentication data) to the retrieved second data entries (e.g., the data retrieved from third-party service providers 18). For example, authentication unit 16 may verify that the data retrieved from third-party service providers 18 corresponds to the data stored at computing device 12.

In some examples, authentication unit 16 may generate the authentication data. For example, authentication unit 16 may generate one or more data entries including any combination of text, images, video or other data. In this example, authentication unit 16 may present the data entries to user 8. User 8 may access, with user device 10, one or more user accounts established at one or more third-party service providers 18, and may store the data entries generated by authentication unit 16 to storage units 20. For example, when the third-party service providers 18 provide social media services, user 8 may post the data entries to one or more social media accounts of user 8.

In addition, authentication unit 16 may be granted access to the user accounts established at the third-party service providers 18. For example, user 8 may grant authentication unit 16 access to the user accounts at third-party service providers 18. In some examples, authentication unit 16 may store the data entries to third-party service providers 18 directly, e.g., using the access granted by user 8.

In the example above, computing device 12 may also retain the data entries at storage units 14. Accordingly, in this example, computing device 12 may maintain the one or more first data entries, while third-party service providers 18 may store the corresponding one or more second data entries. Computing device 12 may also store information to access the user accounts at third-party service providers 18.

To authenticate user 8 (e.g., prior to providing access or private information to a service provided by computing device 12), authentication unit 16 may retrieve the data entries from third-party service providers 18. Authentication unit 16 may compare the retrieved data entries to the data entries stored at storage units 14. For example, authentication unit 16 may verify that the retrieved data entries correspond to the data entries stored to storage units 14.

In some examples, authentication unit 16 may modify one or more of the data entries prior to providing the data entries to user 8 to be stored at third-party service providers 18 (or prior to storing the data entries to the third-party service providers 18 directly, in instances in which authentication unit 16 has authorization to do so). For example, authentication unit 16 may perform one or more encryption techniques on the data entries to at least partially encrypt the data entries. In this example, to verify that the retrieved data entries correspond to the data entries stored to storage units 14, authentication unit 16 may verify that any differences between the data retrieved from third-party service providers 18 and the data stored at storage units 14 are differences inserted by authentication unit 16, e.g., using the encryption techniques when establishing the authentication data.

In a non-limiting example for purposes of illustration, authentication unit 16 may generate one or more images as authentication data. In this example, authentication unit 16 may modify the images by adding an electronic tag to the images (e.g., an exif tag attached to an image container), modifying binary code associated with the images, modifying the appearance of the images themselves, and/or applying other encryption techniques to the images. In some examples, authentication unit 16 may provide the modified images to user 8 to store to user accounts at third-party service providers 18, which may be social media accounts maintained by user 8. In other examples, authentication unit 16 may store the modified images to the user accounts directly. Computing device 12 may also store a copy of the unmodified images. To authenticate user 8, authentication unit 16 may retrieve the modified data entries from third-party service providers 18 and verify that the modified data entries appropriately correspond to the unmodified data entries stored at storage units 14. That is, authentication unit 16 may verify that any differences between the unmodified data entries and the modified data entries are the same as the differences that were present when establishing the authentication data.

In another example, according to aspects of this disclosure, authentication unit 16 may receive data generated by user 8 to establish authentication data. For example, rather than or in addition to generating the authentication data, authentication unit 16 may receive user generated data to be used for authentication. In some examples, computing device 12 may store the user-provided data entries or a modified version of the user-provided data entries (e.g., one or more hash values corresponding to the user-provided data entries) to storage units 14. To authenticate user 8, authentication unit 16 may retrieve the user-provided data entries from third-party service providers 18 and verify that the retrieved data entries appropriately correspond to the data entries stored at storage units 14. That is, in instances in which authentication unit 16 forms a modified version of the data entries, authentication unit 16 may verify that any differences between the user-provided data entries and the data entries stored at storage units 14 are the same as the differences that were inserted by authentication unit 16.

According to aspects of this disclosure, the data used for authentication may be a single data entry or may be more than one data entry. Accordingly, it should be understood that any examples described in the context of multiple data entries herein may also be performed using a single data entry. In addition, according to aspects of this disclosure, data entries for verification may be stored to a single third-party service provider (e.g., stored only to third-party service provider 18A) or may be stored to a plurality of third party service providers 18. For example, data entries for verification may be spread among a number of different third-party service providers 18.

In this way, the techniques of this disclosure may provide enhanced security by leveraging data stored at third-party service providers 18. For example, storing authentication data for a service to other third-party services having their own authentication requirements may enhance the security of the service, because an attacker must be able to determine which third-party service providers 18 are storing the authentication data and gain access to such third-party service providers 18 in order to be able to determine the authentication data for the service. The techniques may also allow user 8 to change authentication credentials for the service provided by authentication unit 16 without accessing computing device 12 directly. For example, the techniques allow user 8 to modify or delete data entries stored to third-party service providers 18 being used for authentication, which results in a break in the correspondence between the data entries stored by computing device 12 and the data entries of stored to third-party service providers 18.

Figure 2:
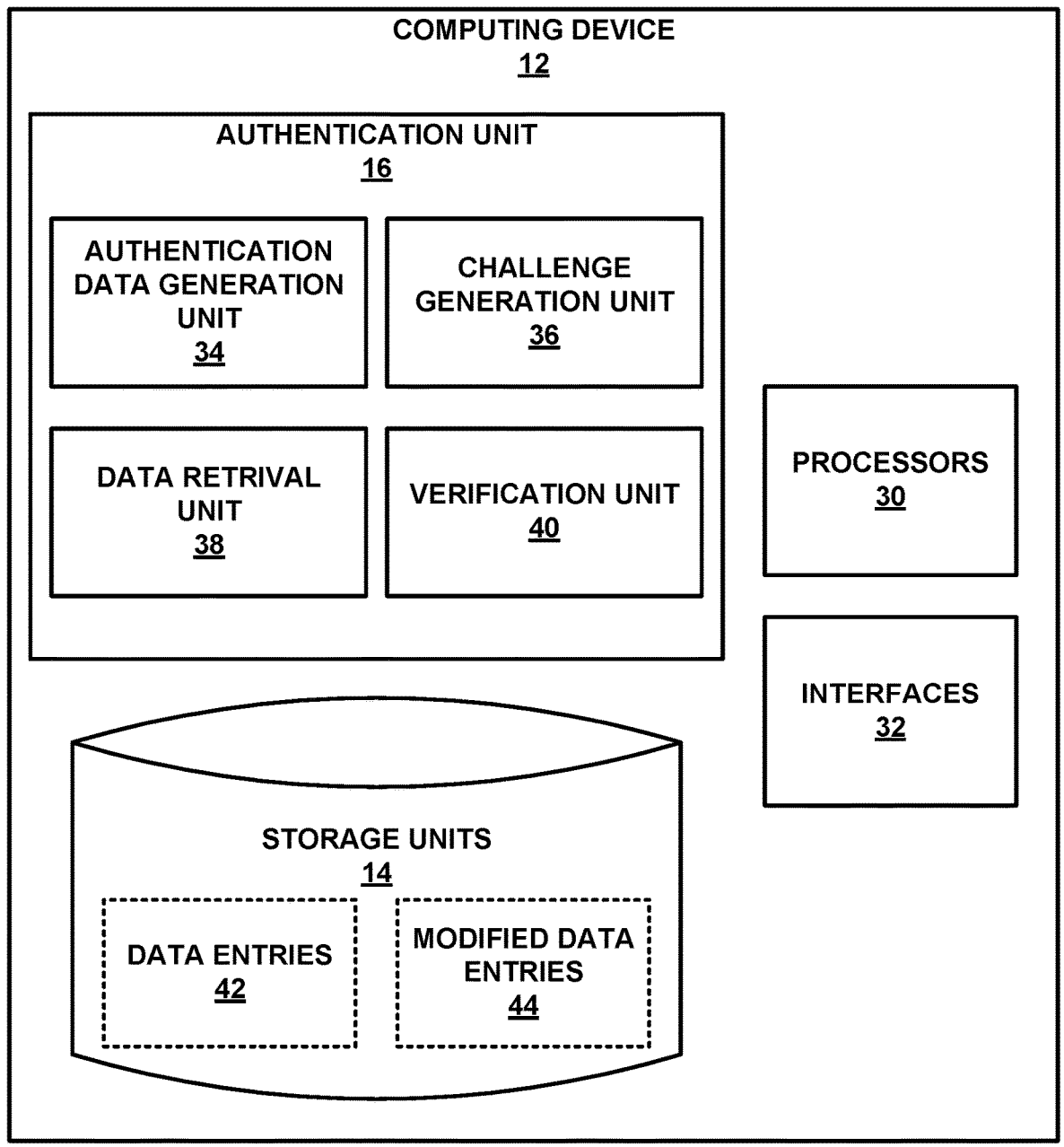
FIG. 2 is a block diagram illustrating an example computing device including the authentication unit from FIG. 1 in greater detail.

FIG. 2 is a block diagram illustrating an example of computing device 12 including authentication unit 16 from FIG. 1 in greater detail. In the illustrated example, computing device 12 includes one or more storage units 14, authentication unit 16, as well as one or more processors 30 and one or more interfaces 32. Authentication unit 16 may be executable by processors 30 or implemented as one or more hardware units of computing device 12. As illustrated in the example of FIG. 2, authentication unit 16 includes authentication data generation unit 34, challenge generation unit 36, data retrieval unit 38, and verification unit 40. In addition, storage units 14 are shown as storing data entries 42 and modified data entries 44. The architecture of computing device 12 illustrated in FIG. 2 is shown for exemplary purposes only and computing device 12 should not be limited to this architecture. In other examples, computing device 12 may be configured in a variety of other ways.

Although not shown in FIG. 2, each of the components, units or modules of computing device 12 are coupled (physically, communicatively, and/or operatively) using communication channels for inter-component communications. In some examples, the communication channels may include a system bus, a network connection, an inter-process communication data structure, or any other method for communicating data.

Processors 30, in one example, are configured to implement functionality and/or process instructions for execution within computing device 12. For example, processors 30 may be capable of processing instructions stored by storage units 14. Processors 30 may include, for example, microprocessors, digital signal processors (DSPs), application specific integrated circuits (ASICs), field-programmable gate array (FPGAs), or equivalent discrete or integrated logic circuitry.

Computing device 12 may utilize interfaces 32 to communicate with external devices via one or more wired or wireless connections. In some examples, computing device 12 utilizes interfaces 32 to communicate with external devices such as user device 10 and third-party service providers 18, from FIG. 1. Interfaces 32 may be universal serial bus (USB) interfaces, optical interfaces, or network interfaces cards, or any other type of interfaces capable of sending and receiving information. Examples of such network interfaces may include Ethernet, Wi-Fi, or Bluetooth radios.

Storage units 16 may store an operating system (not shown) that controls the operation of components of computing device 12. For example, the operating system may facilitate the communication of authentication unit 16 with processors 30, interfaces 32, and storage units 14. In some examples, storage units 14 are used to store program instructions for execution by processors 30. Storage units 14 may also be configured to store information within computing device 12 during operation. Storage units 14 may be used by software or applications (e.g., authentication unit 16) running on processors 30 of computing device 12 to temporarily store information during program execution.

Storage units 14 may include a computer-readable storage medium or computer-readable storage device. In some examples, storage units 14 include one or more of a short-term memory or a long-term memory. Storage units 14 may include, for example, random access memories (RAM), dynamic random access memories (DRAM), static random access memories (SRAM), magnetic hard discs, optical discs, flash memories, or forms of electrically programmable memories (EPROM) or electrically erasable and programmable memories (EEPROM).

According to aspects of this disclosure, authentication unit 16 may be configured to authenticate a user (e.g., user 8 of FIG. 1) of a service provided by computing device 12. In some examples, authentication data generation unit 34 may be configured to generate data entries 42 that are used to authenticate the user (which may be referred to herein as authentication data) and may store data entries 42 to storage units 14. For example, authentication data generation unit 34 may generate one or more data entries 42 for authentication including any combination of text, images, video or other data. In some examples, data entries 42 may be constrained by a data entry type (e.g., text, images, video, or other data) or a time associated with the data entries (e.g., a time at which data entries are generated and/or established at third-party service providers 18).

In some examples, authentication data generation unit 34 may be configured to generate data entries 42 based on data previously generated by the user. For example, data retrieval unit 38 may be configured to retrieve one or more sample data entries generated by the user and stored to one or more third-party service providers (e.g., third-party service providers 18 of FIG. 1). In this example, authentication data generation unit 34 may be configured to generate data entries 42 based on the sample data entries. For example, authentication data generation unit 34 may apply machine learning or other techniques to generate data entries 42 that share similarities with the retrieved sample data entries. In this way, when data entries 42 generated by authentication data generation unit 34 are posted to the third-party service providers, data entries 42 are consistent with other data entries generated by the user so as not to draw attention from potential attackers.

In other examples, authentication data generation unit 34 may be configured to receive data entries 42 from the user. For example, authentication data generation unit 34 may be configured to receive one or more of data entries 42 that were previously generated by the user and stored to user accounts of third-party service providers. In some examples, the user may provide data entries 42 to authentication data generation unit 34. In other examples, authentication data generation unit 34 may be configured to retrieve data entries 42, e.g., using data retrieval unit 38, from the user accounts of the third-party service providers without input from the user.

According to aspects of this disclosure, authentication data generation unit 34 may modify data entries for authentication and may store modified data entries 44 to storage units 44. For example, authentication data generation unit 34 may generate modified data entries 44 based on data entries 42. In some examples, authentication data generation unit 34 may apply one or more encryption techniques to modify data entries 42. For example, for text data entries, authentication data generation unit 34 may apply a encryption techniques such as a one-time pad or another modification and/or encryption technique and may store the modified data to storage units 14. For image data entries, authentication data generation unit 34 may add an electronic tag to the images, modify binary code associated with the images, modify the images themselves, or apply another modification and/or encryption technique and may store modified data entries 44 to storage units 14. For video data entries, authentication data generation unit 34 may modify a frame of one or more of the videos, modify a frame rate of the videos, or apply another modification and/or encryption technique and may store modified data entries 44 to storage units 14. In some examples, authentication data generation unit 34 may apply a hash function to one or more of data entries 42 and may store the resulting hash as modified data entries 44.

Authentication unit 16 may retain data entries 42 at storage units 14 and/or modified data entries 44 at storage units 14 for use during authentication. For example, authentication unit 16 may retain modified data entries 44 at storage units 14 after generating modified data entries 44. In other examples, authentication unit 16 may store modified data entries 44 to user accounts at one or more third-party service providers or may prompt a user to store modified data entries 44 to the user accounts at the one or more third-party service providers.

According to aspects of this disclosure, data entries and/or modified data entries stored to user accounts at one or more third-party service providers may link back to data entries 42 and/or modified data entries 44. For example, authentication data generation unit 34 may generate a link that allows authentication data generation unit 34 to post and/or change data entries stored to the user accounts of one or more third-party service providers. In an example for purposes of illustration, authentication data generation unit 34 may host text, images, videos, or other data, which may be retrieved by the one or more third-party service providers when launching the user account at the one or more third-party service providers. In this way, authentication data generation unit 34 retains control of data entries 42 and/or modified data entries 44.

Challenge generation unit 36 may generate challenge data for use during a user authentication process. For example, as described in greater detail below with respect to FIG. 3, challenge generation unit 36 may generate a user authentication challenge that includes data entries 42 and/or modified data entries 44 for selection by the user. Challenge generation unit 36 may generate a user authentication challenge that includes all or a subset of data entries 42 and/or modified data entries 44. In some examples, challenge generation unit 36 may also preset one or more other data entries not established for authentication from user accounts at third-party service providers to the user, e.g., as retrieved by data retrieval unit 38. Additionally or alternatively, challenge generation unit 36 may generate one or more dummy data entries that do not relate to the user. Accordingly, challenge generation unit 36 may generate a user authentication challenge may include all or a subset of data entries 42 and/or modified data entries 44, other data entries from user accounts at one or more third-party service providers, and/or dummy data entries.

Authentication unit 16 may present the challenge generated by challenge generation unit 36 to the user (e.g., transmit, to user device 10 of user 8 (FIG. 1)) as part of the user authentication process. In a non-limiting example for purposes of illustration, authentication unit 16 may present the generated user authentication challenge, which may include all or a subset of data entries 42 and/or modified data entries 44, other data entries from user accounts at one or more third-party service providers, and/or dummy data entries. Authentication unit 16 may prompt user to select agreed upon data entries 42 and/or modified data entries 44 from the plurality of data entries included in the user authentication challenge. Upon selecting the appropriate data entries 42 and/or modified data entries 44 (e.g., as agreed upon between authentication unit 16 and the user when establishing the authentication data), authentication unit 16 may proceed with retrieving corresponding data entries 42 and/or modified data entries 44 from the appropriate third-party service providers.

Data retrieval unit 38 may retrieve data entries 42 and/or modified data entries 44 from third-party service providers. In examples in which the data entries are constrained to a particular type or time, retrieving the one or more second data entries may include applying a date range or a data type range and retrieving the one or more second data entries based on the data range or the data type range. In some examples, data retrieval unit 38 may also retrieve other data entries from third-party service providers (e.g., for use in the above-described authentication challenge). Data retrieval unit 38 may access data stored to storage units 14, such as data entries 42 and/or modified data entries 44, in order to determine the appropriate data entries to retrieve from the third-party service providers. Data retrieval unit 38 may also store/access authorization data for user accounts at the third-party service providers in order to access the appropriate data entries.

Verification unit 40 may authenticate a user using the authentication data established by authentication data generation unit 34. For example, verification unit 40 may verify that data entries 42 and/or modified data entries 44 retrieved from third-party service providers correspond to data entries 42 and/or modified data entries 44 stored at storage units 14. In examples in which authentication data generation unit 34 applies a hash function to data entries, verification unit 40 may use retrieved data entries as an input during verification. In examples in which authentication data generation unit 34 generates modified data entries 44, verification unit 40 may verify that any differences between data entries 42 and modified data entries 44 are the same as the differences that were inserted by authentication data generation unit 34.

Figure 3:
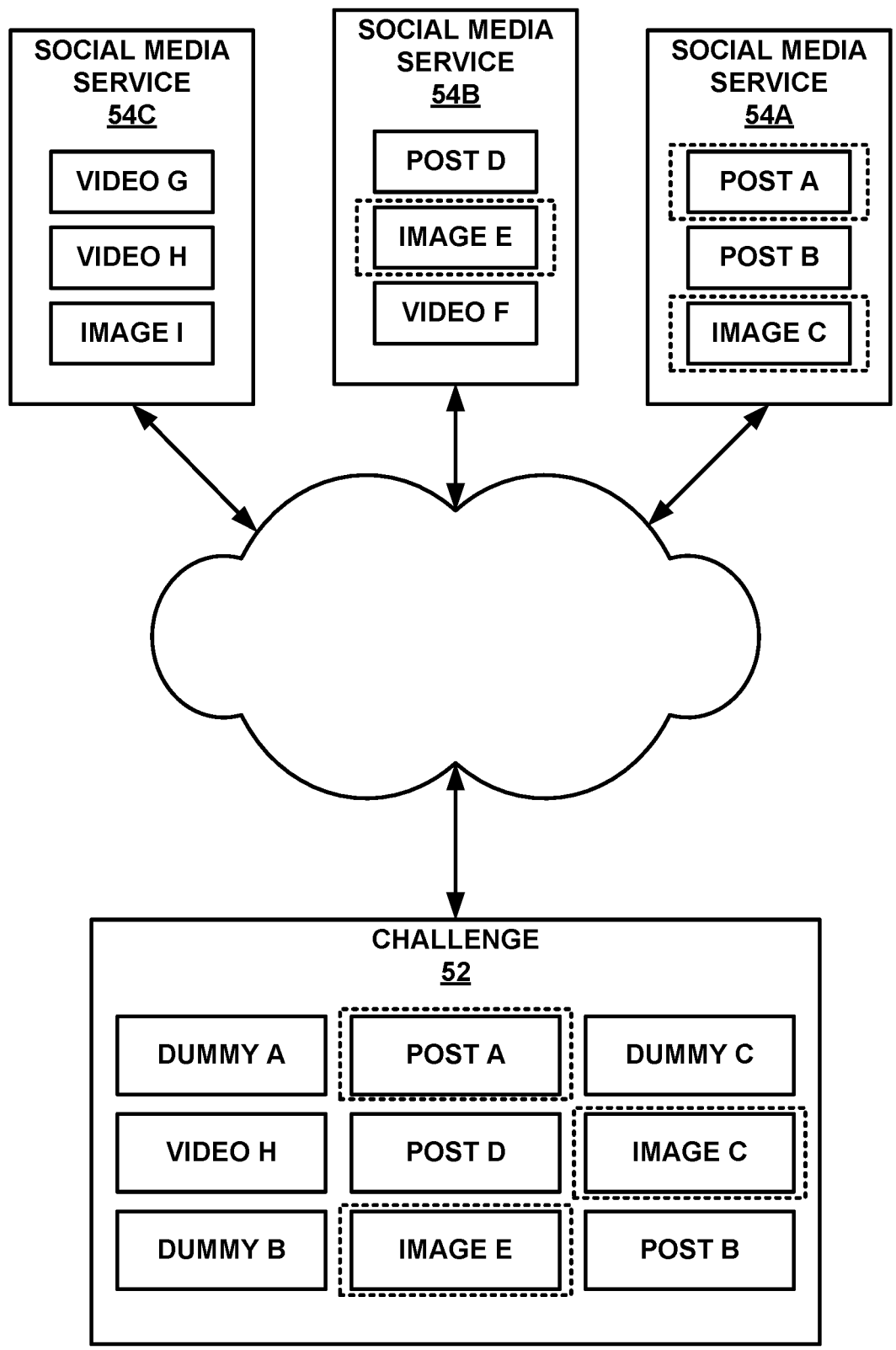
FIG. 3 is a conceptual diagram illustrating an authentication challenge issued by the authentication unit from FIG. 2.

FIG. 3 is a conceptual diagram illustrating an authentication challenge 52 generated by challenge generation unit 36 from FIG. 2. While described with respect to authentication unit 16 for purposes of example, it should be understood that the techniques described with respect to FIG. 3 may be carried out by a variety of other computing devices having other components. The example shown in FIG. 3 includes challenge 52, a social media service 54A having post A, post B, and image C, a social media service 54B having post D, image E, and video F, and a social media service 54C having video G, video H, and image I (collectively, social media services 54).

Authentication unit 16 (e.g., challenge generation unit 36 of authentication unit 16) may generate challenge 52 for use during a user authentication process. Challenge 52 is illustrated having challenge data, which includes dummy A, video H, dummy B, post A, post D, image E, dummy C, image C, and video H. In the example shown in FIG. 3, challenge 52 includes authentication data established between authentication unit 16 and a user, including post A, image C, and image E (illustrated by dashed lines).

In some examples, post A, image C, and image E may comprise all or of a subset of authentication data established between authentication unit 16 and the user. Post A may include a private or public text post established at a user account of social media service 54A. Image C may include a private or public image established at the user account of social media service 54A. Image E may include a private or public image established at the user account of social media service 54B. As described above with respect to FIG. 2, each of post A, image C, and image E may be generated by authentication unit 16 or may be user generated. In addition, each of post A, image C, and image E may be a modified version of a corresponding data entry used for authentication.

Challenge 52 also includes other data entries not established for authentication from social media services 54. For example, challenge 52 includes post B from social media service 54A, post D from social media service 54B, and video H from social media service 54C. These additional data entries may be retrieved from respective social media services 54 for presentation of challenge 52, but are not selected by the user for purposes of authentication. For example, the additional data entries may be presented to obfuscate the data entries established for purposes of verification (e.g., post A, image C, and image E).

Challenge 52 also includes dummy data entries dummy A, dummy B, and dummy C that do not relate to the user. For example, challenge generation unit 36 may generate dummy data entries dummy A, dummy B, and dummy C to even further obfuscate the data entries established for purposes of verification (e.g., post A, image C, and image E).

Authentication unit 16 may use challenge 52 to authenticate the identity of a user, e.g., prior to providing access or secret information to user. In an example for purposes of illustration, authentication unit 16 may establish, with the user, data entries for authentication including post A, image C, and image E. In some examples, post A, image C, and image E, as stored by social media services 54, may be modified versions of corresponding data entries stored to computing device 12. While the example of FIG. 3 includes three data entries associated with two social media services for purposes of illustration, it should be understood that more or fewer data entries may be established at more or fewer third-party service providers.

After establishing the authentication data, authentication unit 16 may receive a request from the user to access services or information provided by computing device 12. Authentication unit 16 may generate challenge 52, which includes data entries for authentication (i.e., post A, image C, and image E), as well as non-authentication data entries (i.e., post B, post D, and video H) and dummy data entries dummy A, dummy B, and dummy C. In other examples, authentication unit 16 may generate challenge 52 to have more or fewer data entries and/or a different mix of data entries (e.g., that may or may not include non-authentication data entries and/or dummy data entries).

Authentication unit 16 may prompt the user to provide input, e.g., via user device 10, to select post A, image C, and image E from challenge 52. Upon selection of the correct data entries, authentication unit 16 may retrieve post A, image C, and image E from social media service 54A and social media service 54B. Authentication unit 16 may then verify that the selected post A, image C, and image E from challenge 52 correctly correspond to the respective data entries retrieved from social media service 54A and social media service 54B. Authentication unit 16 may verify that any modifications to data entries (where applicable) were generated by authentication unit 16 at the time of establishing the authentication data.

Figure 4:
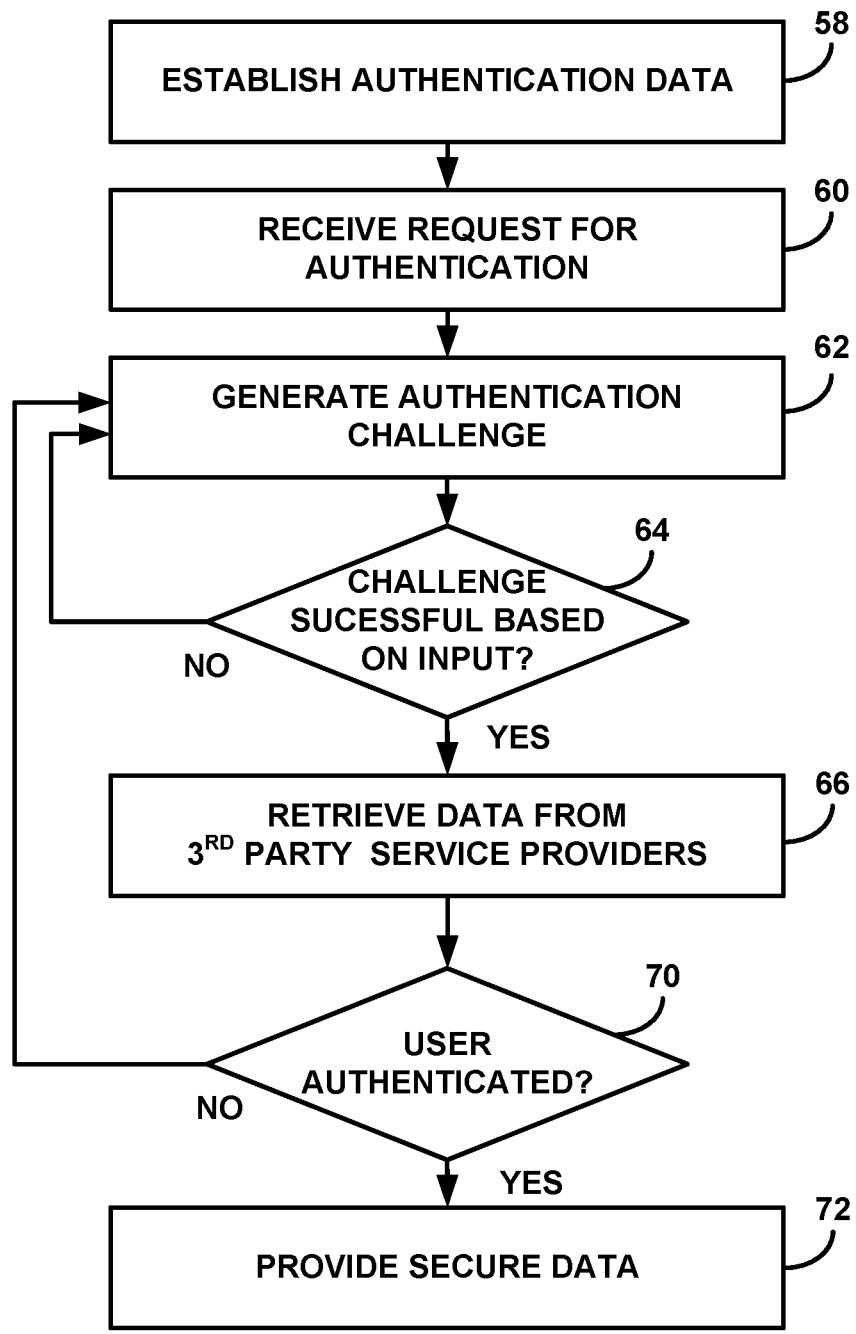
FIG. 4 is a flowchart illustrating an example user authentication process that retrieves user data from one or more third-party service providers to authenticate a user, in accordance with the techniques of this disclosure.

FIG. 4 is a flowchart illustrating an example user authentication process that retrieves user data from one or more third-party service providers to authenticate a user, in accordance with the techniques of this disclosure. The example operation of FIG. 4 is described with respect to authentication unit 16 of computing device 12 from FIGS. 1 and 2, but may be performed by a variety of other computing devices and/or processing units.

In the example of FIG. 4, authentication unit 16 establishes authentication data for authenticating a user of a service (58). The authentication data may include one or more first data entries and one or more second data entries that correspond to the one or more first data entries. The first and second data entries may include any combination of text, images, video, or other data that may be used to authenticate the user.

According to aspects of this disclosure, authentication unit 16 may generate the one or more first data entries and the one or more second data entries. Authentication unit 16 may, in some examples, generate the one or more second data entries to be maintained by at least one third-party service provider by modifying the one or more first data entries. For example, when the one or more first data entries comprise text, modifying the one or more first data entries may include applying an encryption technique to the text. When the one or more first data entries comprise images, modifying the one or more first data entries may include modifying the images, adding an electronic tag to the images, modifying binary code associated with the images, or otherwise manipulating the data of the images. When the one or more first data entries comprise videos, modifying the one or more first data entries may include modifying one or more frames of the videos or modifying a frame rate of the videos. Other modifications are also possible.

In some examples, authentication unit 16 may generate the one or more first data entries based on user-generated data, so that the one or more first data entries appears similar to data entries posted to the at least one third-party service provider. For example, authentication unit 16 may retrieve, from the at least one third-party service provider, one or more sample data entries generated by the user and maintained by the at least one third-party service provider. Authentication unit 16 may then generate the one or more first data entries based on the one or more sample data entries.

In other examples, authentication unit 16 may receive the one or more second data entries from another source. For example, authentication unit 16 may receive (and/or retrieve) the one or more second data entries from a user account of the user established at the at least one third-party service provider. The one or more second data entries may be user-generated data entries. In this example, authentication unit 16 may establish the authentication data by generating the one or more first data entries based on the one or more second data entries. Authentication unit 16 may further store the one or more first data entries, e.g., to storage units 14. In some examples, authentication unit 16 may modify the one or more second data entries to generate the one or more first data entries. For example, authentication unit 16 may be configured to apply one or more encryption techniques, hash functions, or the like to the one or more second data entries.

After establishing the authentication data, authentication unit 16 may receive a request to authenticate the user (60). In a non-limiting example for purposes of illustration, computing device 12 may maintain an online service for accessing financial accounts associated with the user, and the user may request access to the service using a web-based or mobile application. In this example, authentication unit 16 may receive the request to authenticate the user via the web-based or mobile application.

Authentication unit 16 may generate an authentication challenge (62). For example, authentication unit 16 may generate a challenge that includes the one or more first data entries, as well as any combination of non-authentication data entries from the at least one third-party service provider and/or dummy data entries not associated with the user. Accordingly, in this example, the challenge may include a plurality of user selectable data entries that include the one or more first data entries.

Authentication unit 16 may receive input that indicates a selection of the one or more first data entries from the plurality of user selectable data entries and may determine whether the challenge is successful based on the input (64). For example, authentication unit 16 may determine whether the user has correctly selected the one or more first data entries from the generated challenge. If the user has not selected the appropriate entries (the "no" branch of step 64), authentication unit 16 may generate a new challenge (62) or take other action to deny access to user.

If the user selects the one or more first data entries (the "yes" branch of step 64), authentication unit 16 may retrieve the one or more second data entries from the at least one third-party service provider based on the selection (66). For example, authentication unit 16 may use stored credentials to access user accounts at the at least one third-party service provider. Authentication unit 16 may then identify and retrieve the one or more second data entries from the at least one third-party service provider.

Authentication unit 16 may then authenticate the user (70). For example, authentication unit 16 may verify that each of the second data entries were properly retrieved (e.g., that data entries were not missing from the at least one third party service provider). Authentication unit 16 may compare the one or more first data entries to the one or more second data entries to verify correspondence. In examples in which the one or more first data entries or the one or more second data entries have been modified, authentication unit 16 may verify the modifications are the same modifications applied by authentication unit 16 when generating the authentication data.

When the user has been authenticated (the "yes" branch of step 70), authentication unit 16 may provide access and/or secure data to the user (72). When the user has not been authenticated (the "no" branch of step 70), authentication unit 16 may generate a new challenge (62) or take other action to deny access to user.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over a computer-readable medium as one or more instructions or code, and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable gate arrays (FPGAs), or other equivalent integrated or discrete logic circuitry, as well as any combination of such components. Accordingly, the term "processor," as used herein may refer to any of the foregoing structures or any other structure suitable for implementation of the techniques described herein. In addition, in some aspects, the functionality described herein may be provided within dedicated hardware and/or software modules. Also, the techniques could be fully implemented in one or more circuits or logic elements.

The techniques of this disclosure may be implemented in a wide variety of devices or apparatuses, including a microprocessor, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

Various examples have been described. These and other examples are within the scope of the following claims.

What is claimed is:

1. A method comprising:
receiving, by a computing device of a service provider, one or more second data entries associated with a user account of a user at a third-party service provider, wherein the one or more second data entries are user-generated data entries for the user account of the third-party service provider;
generating, by the computing device, one or more first data entries to be stored at the computing device based on the second data entries;
receiving, by the computing device and from a user device, a request to authenticate a user to access a service provided by the service provider, wherein the request to authenticate includes an indication of at least one of the first data entries that are stored at the computing device;
in response to the request to authenticate, retrieving, by the computing device and from the user account of the user at the third-party service provider, at least one of the second data entries that corresponds to the at least one of the first data entries; and
authenticating, by the computing device, the user to access the service provided by the service provider based on a comparison of the at least one of the first data entries stored at the computing device to the at least one of the second data entries retrieved from the user account of the user at the third-party service provider.

2. The method of claim 1, wherein authenticating the user comprises verifying correspondence between the at least one of the first data entries stored at the computing device and the at least one of the second data entries retrieved from the user account of the user at the third-party service provider.

3. The method of claim 2,
wherein generating the one or more first data entries based on the second data entries comprises applying a modification to at least one portion of data included in the second data entries; and
wherein verifying the correspondence comprises verifying that a difference between the at least one of the first data entries and the at least one of the second data entries comprises the modification applied to the at least one portion of the data included in the at least one of the second data entries to generate the at least one of the first data entries.

4. The method of claim 1, wherein the one or more second data entries comprise a plurality of second data entries, and wherein receiving the plurality of second data entries comprises receiving the plurality of second data entries from two or more user accounts of the user at two or more third-party service providers.

5. The method of claim 4, wherein receiving the plurality of second data entries from the two or more user accounts of the user at the two or more third-party service providers comprises accessing each of the user accounts of the user at each of the third-party service providers using credentials for the respective one of the user accounts that are stored at the computing device.

6. The method of claim 4, wherein retrieving the at least one of the second data entries that corresponds to the at least one of the first data entries comprises:
identifying the user account of the user at the third-party service provider from the two or more user accounts of the user at the two or more third-party service providers at which the at least one of the second data entries is stored; and
accessing the user account of the user at the third-party service provider using credentials for the user account that are stored at the computing device.

7. The method of claim 4,
wherein the request to authenticate the user includes an indication of two or more of the first data entries that are stored at the computing device, wherein the two or more of the first data entries correspond to two or more of the second data entries that are stored at different ones of the two or more user accounts of the user at the two or more third-party service providers;
wherein retrieving each of the two or more of the second data entries comprises accessing each of the two or more user account of the user at the two or more third-party service providers using credentials for the user accounts that are stored at the computing device; and
wherein authenticating the user comprises verifying correspondence between each of the two or more of the first data entries stored at the computing device and a respective one of the two or more of the second data entries retrieved from the two or more user accounts of the user at the two or more third-party service providers.

8. The method of claim 1, wherein generating the one or more first data entries based on the second data entries comprises modifying at least one portion of data included in the second data entries.

9. The method of claim 8, wherein the second data entries comprise user-generated text, and wherein modifying the portion of data included in the second data entries comprises applying an encryption technique to the text.

10. The method of claim 8, wherein the second data entries comprise user-generated images, and wherein modifying the portion of data included in the second data entries comprises modifying the images, adding an electronic tag to the images, or modifying binary code associated with the images.

11. The method of claim 8, wherein the second data entries comprise user-generated videos, and wherein modifying the portion of data included in the second data entries comprises modifying a frame of the videos or modifying a frame rate of the videos.

12. The method of claim 1, wherein the user account of the user at the third-party service provider comprises a social media account registered to the user, and wherein the second data entries comprise at least one of text, an image, or a video posted to the social media account of the user.

13. A computing device of a service provider, the computing device comprising:
one or more memory units; and
one or more processors in communication with the memory units, the one or more processors configured to:
receiving one or more second data entries associated with a user account of a user at a third-party service provider, wherein the one or more second data entries are user-generated data entries for the user account of the third-party service provider;
generate one or more first data entries to be stored at the computing device;
receive, from a user device, a request to authenticate a user to access a service provided by the service provider, wherein the request to authenticate includes an indication of at least one of the first data entries that are stored at the computing device;

in response to the request to authenticate, retrieve, from the user account of the user at the third-party service provider, at least one of the second data entries that corresponds to the at least one of the first data entries; and authenticate the user to access the service provided by the service provider based on a comparison of the at least one of the first data entries stored at the computing device to the at least one of the second data entries retrieved from the user account of the user at the third-party service provider.

14. The computing device of claim 13, wherein to authenticate the user, the one or more processors are configured to verify correspondence between the at least one of the first data entries stored at the computing device and the at least one of the second data entries retrieved from the user account of the user at the third-party service provider.

15. The computing device of claim 14,
wherein to generate the one or more first data entries based on the second data entries, the one or more processors are configured to apply a modification to at least one portion of data included in the second data entries; and wherein to verify the correspondence, the one or more processors are configured to verify that a difference between the at least one of the first data entries and the at least one of the second data entries comprises the modification applied to the at least one portion of the data included in the at least one of the second data entries to generate the at least one of the first data entries.

16. The computing device of claim 13, wherein the one or more second data entries comprise a plurality of second data entries, and wherein the one or more processors are configured to:

receive the plurality of second data entries from two or more user accounts of the user at two or more third-party service providers; and to retrieve the at least one of the second data entries that corresponds to the at least one of the first data entries:
identify the user account of the user at the third-party service provider from the two or more user accounts of the user at the two or more third-party service providers at which the at least one of the second data entries is stored, and access the user account of the user at the third-party service provider using credentials for the user account that are stored at the computing device.

17. The computing device of claim 13, wherein the one or more second data entries comprise a plurality of second data entries, and wherein the one or more processors are configured to receive the plurality of second data entries from two or more user accounts of the user at two or more third-party service providers;

wherein the request to authenticate the user includes an indication of two or more of the first data entries that are stored at the computing device, wherein the two or more of the first data entries correspond to two or more of the second data entries that are stored at different ones of the two or more user accounts of the user at the two or more third-party service providers;

wherein to retrieve each of the two or more of the second data entries, the one or more processors are configured to access each of the two or more user account of the user at the two or more third-party service providers using credentials for the user accounts that are stored at the computing device; and wherein to authenticate the user, the one or more processors are configured to verify correspondence between each of the two or more of the first data entries stored at the computing device and a respective one of the two or more of the second data entries retrieved from the two or more user accounts of the user at the two or more third-party service providers.

18. The computing device of claim 13, wherein to generate the one or more first data entries based on the second data entries, the one or more processors are configured to modify at least one portion of data included in the second data entries.

19. The computing device of claim 13, wherein the user account of the user at the third-party service provider comprises a social media account registered to the user, and wherein the second data entries comprise at least one of text, an image, or a video posted to the social media account of the user.

20. A non-transitory computer readable medium having instructions stored thereon that, when executed, cause one or more processors of a computing device of a service provider to:

receive one or more second data entries associated with a user account of a user at a third-party service provider, wherein the one or more second data entries are user-generated data entries for the user account of the third-party service provider;

generate one or more first data entries to be stored at the computing device based on the second data entries;

receive, from a user device, a request to authenticate a user to access a service provided by the service provider, wherein the request to authenticate includes an indication of at least one of the first data entries that are stored at the computing device;

in response to the request to authenticate, retrieve, from the user account of the user at the third-party service provider, at least one of the second data entries that corresponds to the at least one of the first data entries; and authenticate the user to access the service provided by the service provider based on a comparison of the at least one of the first data entries stored at the computing device to the at least one of the second data entries retrieved from the user account of the user at the third-party service provider.

* * * * *